(12) United States Patent
Sillador

(10) Patent No.: US 10,963,631 B2
(45) Date of Patent: Mar. 30, 2021

(54) INFORMATION PROCESSING DEVICE

(71) Applicant: KYOCERA Document Solutions Inc., Osaka (JP)

(72) Inventor: Edward Jay Sillador, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/729,750

(22) Filed: Dec. 30, 2019

(65) Prior Publication Data

US 2020/0226322 A1 Jul. 16, 2020

(30) Foreign Application Priority Data

Jan. 11, 2019 (JP) .............................. JP2019-003594

(51) Int. Cl.
| | | |
|---|---|---|
| *G06F 17/00* | (2019.01) | |
| *G06F 40/174* | (2020.01) | |
| *G06K 9/00* | (2006.01) | |

(52) U.S. Cl.
CPC ....... *G06F 40/174* (2020.01); *G06K 9/00449* (2013.01); *G06K 9/00456* (2013.01); *G06K 2209/01* (2013.01)

(58) Field of Classification Search
CPC .............. G06F 40/174; G06K 9/00449; G06K 9/00456; G06K 2209/01
See application file for complete search history.

(56) References Cited

U.S. PATENT DOCUMENTS

| | | | | |
|---|---|---|---|---|
| 7,496,832 B2* | 2/2009 | Chen | ..................... | G06F 40/174 715/222 |
| 2002/0002565 A1* | 1/2002 | Ohyama | ............. | G06F 3/04812 715/246 |
| 2003/0184589 A1* | 10/2003 | Yamada | ................ | G06F 40/174 715/781 |
| 2005/0111894 A1* | 5/2005 | Hosoi | .................. | G03G 15/607 399/371 |
| 2009/0119574 A1* | 5/2009 | Gitlin | .................... | G06F 40/174 715/209 |
| 2012/0120444 A1* | 5/2012 | Hirohata | .................. | G06K 9/42 358/1.15 |
| 2012/0226969 A1* | 9/2012 | Begole | .................. | G06F 40/174 715/226 |
| 2015/0012339 A1* | 1/2015 | Onischuk | ............... | G07C 13/00 705/12 |
| 2016/0253779 A1* | 9/2016 | Park | ........................ | G06T 3/403 382/264 |
| 2017/0177558 A1* | 6/2017 | Maltz | .................. | G06F 3/04883 |
| 2017/0187924 A1* | 6/2017 | Yasui | .................... | G06F 3/0416 |
| 2018/0349556 A1* | 12/2018 | Owen | ................... | G06F 40/186 |
| 2019/0087463 A1* | 3/2019 | Dua | ........................ | G06F 16/93 |
| 2019/0228220 A1* | 7/2019 | Matsumoto | ........ | G06K 9/00449 |

\* cited by examiner

*Primary Examiner* — Laurie A Ries
(74) *Attorney, Agent, or Firm* — Studebaker & Brackett PC

(57) ABSTRACT

An information processing device processes a first image and a second image. The first image contains a first entry area that is blank. The second image contains a second entry area that is the same as the first entry area. Entry information has been entered in the second entry area. The information processing device includes a first detector and a second detector. The first detector detects the first entry area from the first image. The second detector specifies the second entry area from the second image based on a detection result of the first entry area by the first detector, and detects the entry information entered in the specified second entry area.

12 Claims, 13 Drawing Sheets

HEALTH RUN
REGISTRATION FORM

BIB No:

Registration Period:
JAN 24 ☐    FEB 14 ☐

PARTICIPANT'S INFORMATION

LAST NAME:

FIRST NAME:

MOBILE No.:

ABO
A ☐  B ☐  O ☐  AB ☐

ADDRESS:

_____     _____
Signature                Date

FIG. 2

HEALTH RUN REGISTRATION FORM

BIB No:

Registration Period:
JAN 24 ☐   FEB 14 ☐

PARTICIPANT'S INFORMATION

LAST NAME:

FIRST NAME:

MOBILE No.:

ABO
A ☐  B ☐  O ☐  AB ☐

ADDRESS:

Signature

Date

HEALTH RUN
REGISTRATION FORM

BIB No:

Registration Period:
JAN 24  FEB 14

PARTICIPANT'S INFORMATION

LAST NAME:  FIRST NAME:

MOBILE No.:  ABO  A  B  O  AB

ADDRESS:

Signature                              Date

FIG. 6

HEALTH RUN
REGISTRATION FORM

Ⓐ  16  ╭─F2
BIB No:  607  ←─16a

Registration Period:
Ⓑ ╭─F2 21   Ⓒ ╭─F2
JAN 24 ☑     FEB 14 ☐
         21a

PARTICIPANT'S INFORMATION

LAST NAME: Ⓓ  ╭─F2        FIRST NAME: Ⓔ  ╭─F2
FERNANDEZ                   JOLLYANN

MOBILE No.: Ⓕ  ╭─F2        ABO Ⓖ   Ⓗ   Ⓘ   Ⓙ
0 9 0 1 1 1 1 2 2 2         A☐  B☐  O☐  AB☑
                            F2  F2  F2  F2

ADDRESS: Ⓚ  ╭─F2
40-C BURGOS STREET, BACOLOD CITY

Ⓛ    F2
FERNANDEZ JOLLYANN              11/25/2017
_____         _____
      Signature                     Date

| A | B | C | D | E | F | G | H | I | J | K | L |
|---|---|---|---|---|---|---|---|---|---|---|---|
| 607 | 1 | | FERNANDEZ | JOLLYANN | 09011112222 | | 1 | | | 40-C BURGOS STREETBACOLOD CITY | 11/25/2017 |
| 759 | | 1 | Baker | Kelsey | 09033334444 | | | | 1 | 207 Chickpeas Ln. Weymouth MA | 11/27/2017 |
| ⋮ | ⋮ | ⋮ | ⋮ | ⋮ | ⋮ | ⋮ | ⋮ | ⋮ | ⋮ | ⋮ | ⋮ |

90 — Scan another form
91 — Save to USB
92 — Preview
93 — Send to E-mail
94 — Cancel

FIG. 9

INFORMATION PROCESSING DEVICE

INCORPORATION BY REFERENCE

The present application claims priority under 35 U.S.C. § 119 to Japanese Patent Application No. 2019-003594, filed on Jan. 11, 2019. The contents of this application are incorporated herein by reference in their entirety.

BACKGROUND

The present disclosure relates to an information processing device.

Digitization of information (entry information) entered in a sheet of paper requires a user to for example visually confirm the information entered in the sheet of paper and enter the confirmed information into a personal computer using a keyboard in general.

Here, in a method, an image on a receipt is read by an image reading device, and characters printed on the receipt are then converted into character codes through a character recognition process such as an optical character recognition (OCR) process. In the method, prices printed on the receipt are then detected by analyzing the character codes, and information representing the detected prices is digitized.

SUMMARY

An information processing device according to a first aspect of the present disclosure is an information processing device that processes a first image and a second image. The first image contains a first entry area that is blank. The second image contains a second entry area which is the same as the first entry area and in which entry information has been entered. The information processing device includes a first detector and a second detector. The first detector detects the first entry area from the first image. The second detector specifies the second entry area from the second image based on a detection result of the first entry area by the first detector and then detects the entry information entered in the specified second entry area.

An information processing device according to a second aspect of the present disclosure processes an image containing an entry area in which entry information has been entered. The information processing device includes a detector and a modification section. The detector detects the entry area from the image. The modification section receives at least one of modifications. The modifications include an alteration to the entry area, addition of an entry area, and removal of the entry area.

BRIEF DESCRIPTION OF THE DRAWINGS

FIG. 2 illustrates a first image in the embodiment.

FIG. 4 illustrates first entry areas detected from the first image in the embodiment.

FIG. 5 illustrates an on-screen preview containing the first image in the embodiment.

FIG. 6 illustrates IDs assigned to the first image in the embodiment.

FIG. 7 illustrates a second image in the embodiment.

FIG. 9 illustrates an on-screen preview containing the table displayed on the display section in the embodiment.

DETAILED DESCRIPTION

Figure 1:
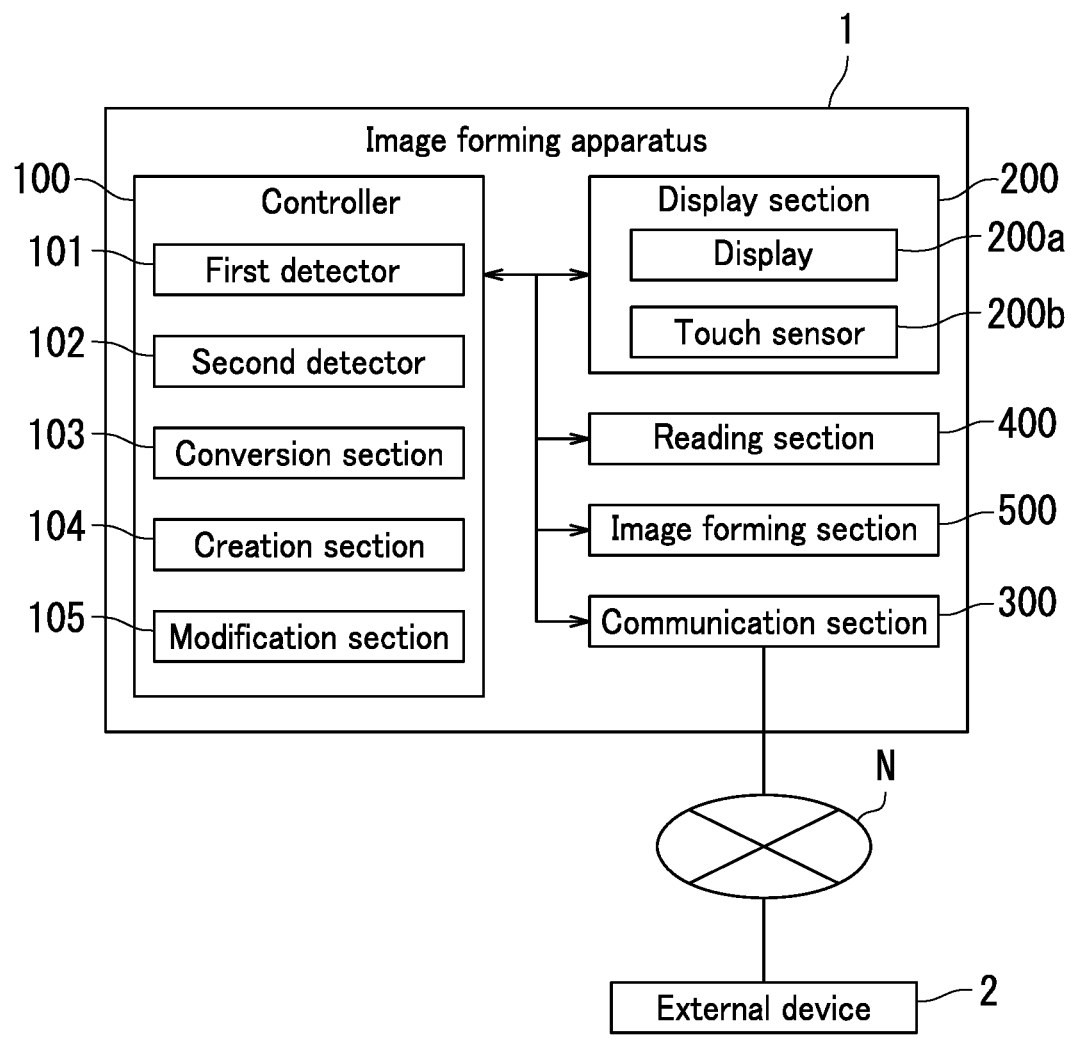
FIG. 1 illustrates an image forming apparatus according to an embodiment of the present disclosure.

An embodiment of the present disclosure will hereinafter be described with reference to the accompanying drawings. The present disclosure is however not limited to the embodiment below. The same or corresponding parts in the drawings are denoted by the same reference signs, and description thereof will not be repeated.

An information processing device according to an embodiment of the present disclosure will first be described with reference to FIG. 1. In the present embodiment, an image forming apparatus 1 is described as an example of the information processing device. Note that examples of the information processing device include an image reading device, a mobile terminal (e.g. smartphone), a tablet terminal, and a personal computer.

FIG. 1 illustrates the image forming apparatus 1. As illustrated in FIG. 1, the image forming apparatus 1 includes a controller 100, a display section 200, a communication section 300, a reading section 400, and an image forming section 500.

The controller 100 includes a processor and storage. Examples of the processor include a central processing unit (CPU) and a micro processing unit (MPU). The storage includes memory such as semiconductor memory, and may further include a hard disk drive (HDD). The storage stores therein a computer program. The controller 100 controls each component of the image forming apparatus 1. Specifically, the processor of the controller 100 executes the computer program stored in the storage, thereby controlling the display section 200, the communication section 300, the reading section 400, and the image forming section 500. In addition, the processor of the controller 100 executes the computer program stored in the storage, thereby functioning as a first detector 101, a second detector 102, a conversion section 103, a creation section 104, and a modification section 105. That is, the controller 100 includes a first detector 101, a second detector 102, a conversion section 103, a creation section 104, and a modification section 105. The first detector 101, the second detector 102, the conversion section 103, the creation section 104, and the modification section 105 will be described in detail later.

The display section 200 displays an image, and is also used for receiving user operations. The display section 200 includes a display 200a and a touch sensor 200b. Examples of the display 200a include a liquid-crystal panel, and an organic electroluminescent (organic EL) panel. The touch sensor 200b receives a user operation to enter an operation signal according to the user operation into the controller 100. The touch sensor 200b is disposed on for example a display surface of the display 200a.

The communication section 300 communicates with an external device 2 via a communication network N. The communication section 300 is for example a communication module (communication device) such as a local area network (LAN) board. Examples of the communication network N includes the Internet and a leased line. The communication section 300 transmits a request from the controller 100 to the external device 2. The reading section 400 individually reads a first image G1 formed on a first sheet and a second image G2 formed on a second sheet. The first and second images G1 and G2 will be described in detail later.

The image forming section 500 forms an image on a sheet. Specifically, the image forming section 500 forms an image on a sheet fed from a cassette of the image forming apparatus 1. Specifically, the image is a toner image. The image forming section 500 includes a photosensitive drum, a charger, a light exposing section, a developing section, a transfer section, a cleaner, and a static eliminator. The image is formed on the sheet by the photosensitive drum, the charger, the light exposing section, the developing section, and the transfer section. The cleaner removes remaining toner on a surface of the photosensitive drum. The eliminator removes residual charge on the surface of the photosensitive drum. After forming the image on the sheet, the image forming section 500 feeds the sheet toward a fixing section of the image forming apparatus 1. The fixing section heats and pressurizes the image, thereby fixing the image on the sheet.

Processing of the first image G1 by the image forming apparatus 1 will next be described with reference to FIG. 2. FIG. 2 depicts an example of the first image G1 formed on a first sheet. In the present embodiment, a registration card for a marathon race is exemplified. In the present embodiment, the first sheet is a template of the registration card for the marathon race. As illustrated in FIG. 2, the first image G1 is formed on the first sheet. The first image G1 contains first entry areas F1. Each first entry area F1 is an area that allows a user who has received the registration card for the marathon race to enter information therein. Each first entry area F1 contained in the first image G1 is blank.

Figure 3A:
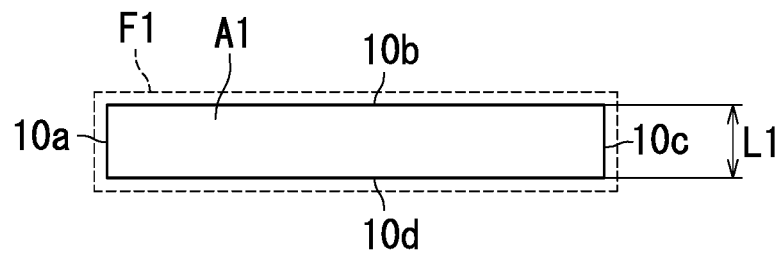
FIG. 3A illustrates a first character area in the embodiment.
Figure 3B:
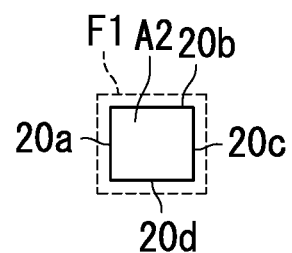
FIG. 3B illustrates a second character area in the embodiment.
Figure 3C:
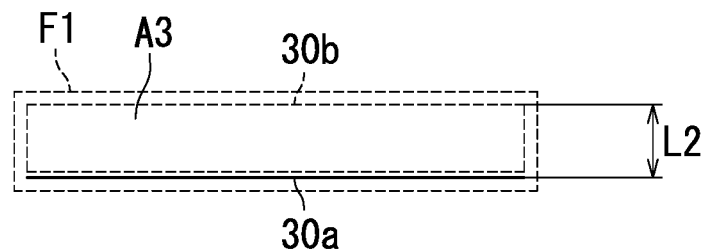
FIG. 3C illustrates a third character area in the embodiment.
Figure 3D:
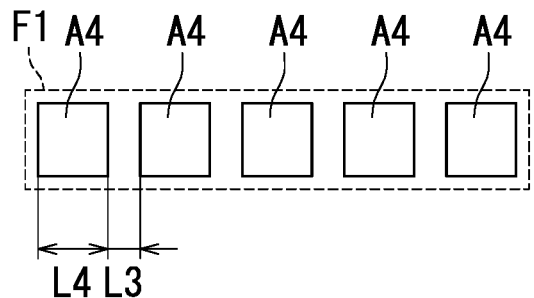
FIG. 3D illustrates fourth character areas in the embodiment.

A detection method of the first entry areas F1 by the first detector 101 will next be described with reference to FIGS. 3A to 3D. FIGS. 3A to 3D illustrate first entry areas F1 that are different from each other. As illustrated in FIG. 3A, a first entry area F1 contains a first character area A1. As illustrated in FIG. 3B, a different first entry area F1 contains a second character area A2. As illustrated in FIG. 3C, one more different first entry area F1 contains a third character area A3. As illustrated in FIG. 3D, a further more different first entry area F1 contains fourth character areas A4. Each of the first to fourth character areas A1 to A4 is blank. Note that FIGS. 3A to 3D illustrate the first entry areas F1 by broken lines in order to facilitate understanding.

The first detector 101 performs so called "edge detection processing" with respect to the first image G1, thereby detecting edges in the first image G1. Examples of the edge detection processing include a known Canny edge detector and known differential edge detection processing. In addition, the first detector 101 performs so called "line detection processing" with respect to the first image G1, thereby detecting lines in the first image G1. The line detection processing uses Hough transform.

With reference to FIG. 3A, a method of detecting the first character area A1 from the first image G1 read by the reading section 400 will first be described. FIG. 3A illustrates the first character area A1. The first character area A1 allows entry information containing one or more characters to be entered therein. Examples of the characters in this example include at least one of characters, examples of which include a numerical character, a mark, and a letter such as Hiragana, Katakana, a Chinese character and a letter of an alphabet.

As illustrated in FIG. 3A, the first character area A1 has a quadrilateral shape. In the present embodiment, the first character area A1 is rectangular in shape. Also in the present embodiment, the first character area A1 includes four sides 10a, 10b, 10c, and 10d. Of the four sides 10a to 10d, opposite sides 10a and 10c are identical in length, and opposite sides 10b and 10d are identical in length. In addition, of the four sides 10a to 10d, the opposite sides 10a and 10c are parallel to each other, and the opposite sides 10b and 10d are parallel to each other. The first character area A1 includes four pairs of adjacent sides which are different in length. Specifically, of the four sides 10a to 10d, the side 10a and the side 10b are different in length, the side 10b and the side 10c are different in length, the side 10c and the side 10d are different in length, and the side 10d and the side 10a are different in length. An area surrounded by the four sides 10a to 10d is blank with not a character nor a figure.

The first detector 101 detects the four sides 10a to 10d as edges from the first image G1. When the area surrounded by the four sides 10a to 10d is blank, the first detector 101 detects the first character area A1. Here, the first character area A1 being detected is equivalent to the corresponding first entry area F1 being detected.

With reference to FIG. 3B, a method of detecting the second character area A2 from the first image G1 read by the reading section 400 will next be described. FIG. 3B illustrates the second character area A2. The second character area A2 allows entry information containing a check mark to be entered therein. In this example, the entry information consists of the check mark.

As illustrated in FIG. 3B, the second character area A2 has a quadrilateral shape. In the present embodiment, the second character area A2 is square in shape. Also in the present embodiment, the second character area A2 includes four sides 20a, 20b, 20c, and 20d. The four sides 20a to 20d are identical in length. Of the four sides 20a to 20d, opposite sides 20a and 20c are parallel to each other, and opposite sides 20b and 20d are parallel to each other. An area surrounded by the four sides 20a to 20d is blank with not a character nor a figure.

The first detector 101 detects the four sides 20a to 20d as edges from the first image G1. When the area surrounded by the four sides 20a to 20d is blank, the first detector 101 further detects the second character area A2. The second character area A2 being detected is equivalent to the corresponding first entry area F1 being detected.

With reference to FIG. 3C, a method of detecting the third character area A3 from the first image G1 read by the reading section 400 will next be described. FIG. 3C illustrates the third character area A3. In the present embodiment, the third character area A3 allows entry information containing one or more characters to be entered therein.

As illustrated in FIG. 3C, the third character area A3 includes a line segment 30a elongated in one direction. In the present embodiment, the line segment 30a is a straight line. The first detector 101 detects line segments 30a from the first image G1. When an adjacent area 30b adjacent to the line segment 30a on an upper side of the line segment 30a is blank, the first detector 101 further detects the third character area A3. The third character area A3 being detected is equivalent to the corresponding first entry area F1 being detected. Note that height L2 of the adjacent area 30b is set to height L1 of the first character area A1 or height of the second character area A2, which are detected from the first image G1. In the present embodiment, the height L2 of the adjacent area 30b is the same as height L1 of the first character area A1 illustrated in FIG. 3A.

With reference to FIG. 3D, a method of detecting the fourth character areas A4 from the first image G1 read by the reading section 400 will next be described. FIG. 3D illustrates the fourth character areas A4. In the present embodiment, the fourth character areas A4 allow one or more characters as entry information to be individually entered therein.

As illustrated in FIG. 3D, each of the fourth character areas A4 has a quadrilateral shape. In the present embodiment, each fourth character area A4 is square in shape. In addition, each fourth character area A4 is blank with not a character nor a figure. The fourth character areas A4 are aligned in a straight line. Of the fourth character areas A4, an interval L3 between each pair of adjacent fourth character areas A4 is shorter than length L4 of one side of each fourth character area A4. The fourth character areas A4 being detected is equivalent to the corresponding first entry area F1 being detected.

The first entry areas F1 detected from the first image G1 will next be described with reference to FIG. 4. The reading section 400 first reads the first image G1 formed on the first sheet. The first detector 101 then detects the first entry areas F1 from the first image G1. Specifically, the first detector 101 detects, as the first character area A1, a first name area 11, a last name area 12, and an address area 13 as illustrated in FIG. 4. The first detector 101 also detects, as the second character area A2, a first registration date area 21, a second registration date area 22, a group (blood group) A area 23, a group B area 24, and a group O area 25. The first detector 101 further detects, as the third character area A3, a signature area 31 and a date area 32. The first detector 101 furthermore detects, as the four character areas A4, telephone number digit areas 41.

Note that a bib number image 50 is displayed above a bib number area 16 in the first image G1. That is, the first detector 101 determines that the bib number area 16 is not blank. The first detector 101 therefore does not detect the bib number area 16 as the first character area A1. In other words, the first detector 101 does not detect the bib number area 16 as the first entry area F1. In addition, part of "B" of the alphabet is displayed in a group AB area 26 in the first image G1. The first detector 101 accordingly determines that the group AB area 26 is not blank. The first detector 101 therefore does not detect the group AB area 26 as the second character area A2. The first detector 101 does not detect the bib number area 16 as the first entry area F1. Here, in FIG. 4, each of the bib number area 16 that is not detected as the first entry area F1 and the group AB area 26 that is not detected as the first entry area F1 is indicated by a dashed and double dotted line in order to facilitate understanding.

Figure 5:
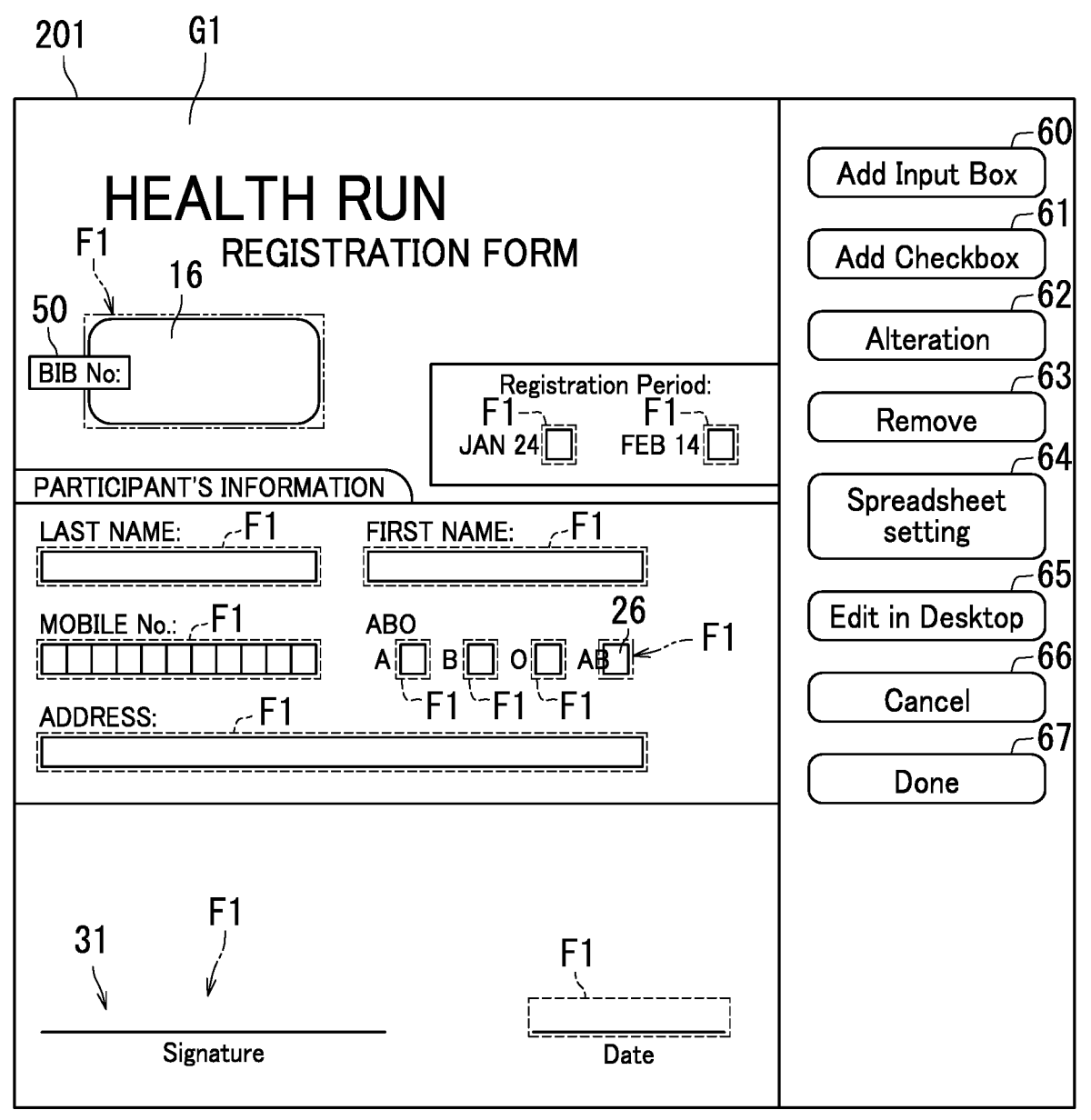

Modifications to the first entry areas F1 to be received by the modification section 105 will next be described with reference to FIG. 5. FIG. 5 illustrates an on-screen preview 201 including the first image G1. After the first detector 101 detects the first entry areas F1 from the first image G1, the display section 200 displays the on-screen preview 201 including the first image G1 as illustrated in FIG. 5. The on-screen preview 201 includes respective detection results of the first entry areas F1 by the first detector 101. In the on-screen preview 201, each of the first entry areas F1 is depicted by a dashed line. The on-screen preview 201 also includes a first add button 60 ("Add Input Box" in FIG. 5), a second add button 61 ("Add Checkbox" in FIG. 5), an alteration button 62, a remove (delete) button 63, a table setting button 64 ("Spreadsheet setting" in FIG. 5), an access button 65 ("Edit in Desktop" in FIG. 5), a cancel button 66, and a done button 67 that are displayed on the display section 200. The on-screen preview 201 being displayed allows the modification section 105 to receive at least one of modifications. Here, the modifications include an alteration to a first entry area F1, addition of a first entry area F1, and removal of a first entry area F1. A modification to a first entry area F1 received by the modification section 105 will hereinafter be described in detail.

When the first add button 60 is pushed and the display section 200 (first image G1) is then touched, the modification section 105 receives addition of a first entry area F1 that allows entry information containing characters to be entered therein and that is to be located at the touched place in the first image G1. Specifically, for example, when a user pushes the first add button 60 and then slides the user finger on the bib number area 16 on the display section 200, the modification section 105 receives addition of the bib number area 16 as the first entry area F1. According to a pinch-out operation, a pinch-in operation, a slide operation, or a flick operation, the modification section 105 may further receive an alteration to size of the first entry area F1 that allows the characters to be entered therein. In FIG. 5, the newly added first entry area F1 onto the bib number area 16 is depicted by a dashed and double dotted line in order to facilitate understanding. The newly added first entry area F1 may be displayed by a dashed line.

When the second add button 61 is pushed and the display section 200 (first image G1) is then touched, the modification section 105 receives addition of a first entry area F1 that allows entry information containing a check mark to be entered therein and that is to be located at the touched place in the first image G1. Specifically, for example, when the user pushes the second add button 61 and then slides the user finger on the group AB area 26 on the display section 200, the modification section 105 receives addition of the group AB area 26 as the first entry area F1. According to a pinch-out operation, a pinch-in operation, a slide operation, or a flick operation, the modification section 105 may further receive an alteration to size of the first entry area F1 that allows the check mark to be entered therein. In FIG. 5, the newly added first entry area F1 onto the group AB area 26 is depicted by a dashed and double dotted line in order to facilitate understanding. The newly added first entry area F1 may be depicted by a dashed line.

When the alteration button 62 is pushed and the display section 200 (first image G1) is then touched, the modification section 105 modifies size of a previously detected or added first entry area F1. Specifically, when the user pushes the alteration button 62 and then drags the previously detected or added first entry area F1 to a desired position on the display section 200, the modification section 105 receives an alteration to the size of the first entry area F1 according to the drag operation. The modification section 105 may receive the alteration to the size of the first entry area F1 according to a pinch-out operation, a pinch-in operation, a slide operation, or a flick operation.

When the remove button 63 is pushed and the display section 200 (first image G1) is then touched, the modification section 105 receives removal of a corresponding first entry area F1. Specifically, for example, when the user pushes the remove button 63 and then taps the first entry area F1 on the signature area 31 (see FIG. 4) on the display section 200, the modification section 105 removes the tapped first entry area F1. In FIG. 5, the removed first entry area F1 on the signature area 31 is depicted by a long dashed short dashed line in order to facilitate understanding.

When the table setting button 64 is pushed, the creation section 104 receives a setting of Table T. The setting of Table T will be described later. When the access button 65 is pushed, it allows the user to modify the first entry areas F1 in the first image G1 by using the external device 2. The modification to the first entry areas F1 by using the external device 2 will be described later. When the cancel button 66 is pushed, a creation process of Table T is cancelled. When the done button 67 is pushed, the detected and/or modified first entry areas F1 are fixed. Thus, the fixed first entry areas F1 are assigned respective IDs. Each ID is identification information. Assignment of the IDs will hereinafter be described with reference to FIG. 6.

FIG. 6 illustrates the IDs assigned to the first entry areas F1. As illustrated in FIG. 6, the first entry areas F1 fixed in the on-screen preview 201 are assigned the respective IDs. The bib number area 16 is assigned for example ID 70 of "A". The first registration date area 21 is assigned for example ID 71 of "B". Thus, the first entry areas F1 are assigned respective IDs 70 to 81. Note that in the present embodiment, IDs 70 to 81 are sequentially assigned from the upper left to the lower right in the first image G1. Each of IDs 70 to 81 is identification information, and relates its own first entry area F1 to a corresponding second entry area F2. The second image G2 and the second entry areas F2 will hereinafter be described with reference to FIG. 7. Note that IDs 70 to 81 are not actually displayed.

FIG. 7 illustrates the second image G2 formed on the second sheet. In the present embodiment, the second sheet is a filled-in registration card for the marathon race. That is, the second sheet is a sheet that is obtained by duplicating the first image G1 on the first sheet and contains pieces of entry information entered by the user. The second image G2 is formed on the second sheet. After the first entry areas F1 in the first image G1 are assigned the respective IDs 70 to 81, the reading section 400 reads the second image G2 formed on the second sheet. The second image G2 contains the second entry areas F2. The user participating in the marathon race enters respective pieces of user information in the second entry areas F2 on the registration card for the marathon race. That is, the respective pieces of entry information are entered in the second entry areas F2 in the second image G2. For example, entry information 16a of "607" is entered in a second entry area F2 of the bib number area 16. For example, entry information 16a of a check mark is entered in a second entry area F2 of the first registration date area 21. The second entry areas F2 in the second image G2 are the same as the respective first entry areas F1 in the first image G1 illustrated in FIG. 6. That is, the second entry areas F2 correspond one-to-one to the first entry areas F1.

The second detector 102 specifies the second entry areas F2 in the second image G2 based on the respective detection results of the first entry areas F1 by the first detector 101, and detects respective pieces of entry information entered in the specified second entry areas F2. Specifically, the second detector 102 specifies the second entry areas F2 in the second image G2 based on coordinate information, in the first image G1, of each of the first entry areas F1 detected by the first detector 101. The second detector 102 then detects the respective pieces of entry information entered in the specified second entry areas F2. For example, based on the coordinate information of the bib number area 16 detected by the first detector 101, the second detector 102 specifies the second entry area F2 of the bib number area 16 from the second image G2. The second detector 102 then detects characters of "607" entered in the specified bib number area 16. Note that the specified second entry area F2 is assigned, of IDs 70 to 81, an ID assigned to the first entry area F1 corresponding to the second entry area F2.

The conversion section 103 converts the entry information detected from the second image G2 into text data. Specifically, the conversion section 103 converts the entry information into the text data through a character recognition process such as an optical character recognition (OCR) process. For example, the conversion section 103 convers "607" in the bib number area 16 detected by the second detector 102 into the text data through the character recognition process.

As described above with reference to FIGS. 1 to 7, in the present embodiment, the respective pieces of entry information entered in the second entry areas F2 corresponding to the first entry arears F1 are detected from the second image G2 based on the respective detection results of the first entry areas F1 by the first detector 101. It is therefore possible to detect the respective pieces of entry information from the second image G2 based on the first entry areas F1 detected in advance. This consequently enables precise detection of the respective pieces of entry information from the second image G2.

In the present embodiment, the first entry areas F1 include the first character areas A1 each of which allows characters to be entered therein and has the quadrilateral shape including the four pairs of adjacent sides 10a to 10d which are different in length. The first detector 101 therefore easily detects the first entry areas F1 each of which is the first character area A1 that allows a character string as the characters to be entered therein. This consequently enables the second detector 102 to precisely specify the second entry areas F2 corresponding to the first entry areas F1, thereby precisely detecting corresponding pieces of entry information from the second image G2.

In the present embodiment, the first entry areas F1 include the blank second character areas A2 each of which allows a check mark to be entered therein and has the quadrilateral shape. The first detector 101 therefore easily detects the first entry areas F1 of the second character areas A2 each of which allows the check mark to be entered therein. This consequently enables the second detector 102 to precisely specify the second entry areas F2 corresponding to the first entry areas F1, thereby precisely detecting corresponding pieces of entry information from the second image G2.

In the present embodiment, the first entry areas F1 include the blank third character areas A3 each of which allows characters to be entered therein and includes the line segment 30a elongated in the one direction. Therefore, even when the first image G1 includes the first entry areas F1 each of which is not surrounded by any sides, the first detector 101 is able to detect the first entry areas F1 of the third character area A3 from the first image G1. This consequently enables the second detector 102 to precisely specify the second entry areas F2 corresponding to the first entry areas F1, thereby precisely detecting corresponding pieces of entry information from the second image G2.

In the present embodiment, the first entry areas F1 include the fourth character areas A4 that allow characters to be individually entered therein and each have their own quadrilateral shapes. The fourth character areas A4 are aligned in a straight line. Of the fourth character areas A4, the interval L3 between each pair of adjacent fourth character areas A4 is shorter than the length L4 of one side of each fourth character area A4. The second detector 102 is therefore able to detect each of the characters as entry information individually entered in the character areas A4. This consequently enables the second detector 102 to precisely specify the second entry area F2 corresponding to the first entry area F1, thereby precisely detecting the corresponding entry information from the second image G2.

The present embodiment receives at least one of the modifications. Here, the modifications include an alteration to a first entry area F1, addition of a first entry area F1, and removal of a first entry area F1. This therefore enables the user to freely modify the first entry areas F1 detected by the first detector 101. This improves user convenience.

In the present embodiment, the first image G1 formed on the first sheet and the second image G2 formed on the second sheet are read individually. The second sheet is a sheet that is obtained by duplicating the first image G1 on the first sheet and contains the pieces of entry information filled in by the user. This therefore enables the image forming apparatus 1 to individually process the first image G1 and the second image G2. This improves user convenience.

Figures 8A, 8B:
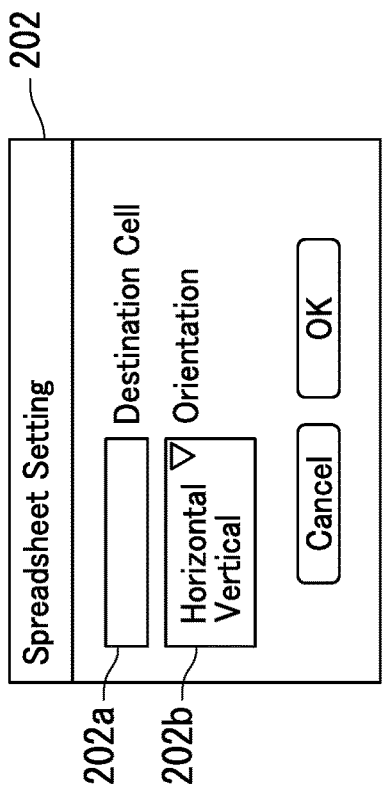
FIG. 8A illustrates a dialog box displayed on a display section in the embodiment.
FIG. 8B illustrates a table created by a creation section in the embodiment.

Table T created by the creation section 104 will next be described with reference to FIGS. 5 to 8B. FIG. 8A illustrates a dialog box 202 displayed on the display section 200. When the table setting button 64 illustrated in FIG. 5 is pushed, the dialog box 202 illustrated in FIG. 8A is displayed on the display section 200. The dialog box 202 contains a first setting area 202a and a second setting area 202b. The first setting area 202a allows location information of an entry field in Table T to be entered therein. Based on the location information entered in the first setting area 202a in Table T, the creation section 104 sets entry fields each of which allows text data to be entered therein. Specifically, the creation section 104 sets, to an entry field corresponding to the location information entered in the first setting area 202a, an entry field in which of the pieces of entry information detected from the second image G2, text data of the entry information entered in the second entry area F2 assigned first ID 70 is entered.

The second setting area 202b displays "Horizontal" and "Vertical" each of which is selectable as an item designating an orientation of Table T. For example, when the "Horizontal" is selected in the second setting area 202b, the creation section 104 individually enters pieces of text data obtained from the one second image G2 in entry fields aligned horizontally in Table T. Alternatively, when the "Vertical" is selected in the second setting area 202b, the creation section 104 individually enters the pieces of text data obtained from the one second image G2 in entry fields aligned vertically in Table T. In an example of the present embodiment to be described below, the orientation of Table T is horizontal.

FIG. 8B illustrates Table T created by the creation section 104. As illustrated in FIG. 8B, Table T contains entry fields C1 to C26. Based on the respective detection results of the first entry areas F1 by the first detector 101, the creation section 104 creates Table T containing the entry fields C1 to C26. Specifically, the creation section 104 creates Table T containing the entry fields C1 to C26 according to IDs 70 to 81 assigned to the first entry areas F1 (see FIG. 6).

IDs 70 to 81 correspond to the entry fields C1 to C12, respectively. The second entry areas F2 assigned IDs 70 to 81 correspond to the entry fields C15 to C26, respectively. Here, second entry areas F2 assigned an identical ID are aligned in a straight line in a vertical direction in Table T. Specifically, the second entry area F2 assigned ID 70 corresponds to the entry field C15, beneath the entry field C1 corresponding to ID 70, of the entry fields C15 to C26.

The creation section 104 enters text data converted by the conversion section 103 in any one of the entry fields C15 to C26 according to a second entry area F2. For example, of the second entry areas F2, "607" as the entry information entered in the second entry area F2 assigned ID 70 is entered in the entry field C15 beneath the entry field C1 corresponding to ID 70.

Here, the creation section 104 may set size of each of the entry fields C1 to C12 in Table T according to size of a corresponding one of the first entry areas F1. For example, of the first entry areas F1 illustrated in FIG. 6, size of the first registration date area 21 is relatively small, and size of the address area 13 is relatively large. The creation section 104 therefore sets Table T so that size of the entry field C2 corresponding to the first registration date area 21 becomes relatively small and size of the entry field C11 corresponding to the address area 13 becomes relatively large.

As described above with reference to FIGS. 6 to 8B, for example, the present embodiment enters, in the entry field C15 according to the first entry area F1 corresponding to ID 70 of the entry fields C15 to C26, corresponding text data. Thus, in Table T, respective pieces of entry information entered in second entry areas F2 assigned an identical ID in second images G2 are aligned in one direction, and respective pieces of entry information entered in second entry areas F2 assigned a different identical ID in the second images G2 are aligned in a different direction. This makes it easier for the user to search desired text data in Table T.

In the present embodiment, the size of each of the entry fields C1 to C12 in Table T is set according to the size of a corresponding one of the first entry areas F1. This makes it easier for the user to visually grasp the entry fields C1 to C12 corresponding to the first entry areas F1 in Table T.

An on-screen preview 203 of Table T displayed on the display section 200 will next be described with reference to FIG. 9. FIG. 9 illustrates the on-screen preview 203 of Table T. As illustrated in FIG. 9, the display section 200 displays Table T in the on-screen preview 203. This enables the user to visually confirm Table T by viewing the on-screen preview 203. The on-screen preview 203 displayed on the display section 200 includes a scan button 90 ("Scan another form" in FIG. 9), a save button 91 ("Save to USB" in FIG. 9), a preview button 92, a send button 93 ("Send to E-mail" in FIG. 9), and a cancel button 94.

By pushing the scan button 90, the user is able to cause the reading section 400 to read a second image G2 formed on a second sheet different from the previously read second sheet. When the save button 91 is pushed, Table T created by the creation section 104 is stored in external memory. Examples of the external memory include universal serial bus memory and a secure digital (SD) card. The external memory may store therein Table T displayed in the on-screen preview 203, and Table T being created and not displayed in the on-screen preview 203.

When the preview button 92 is pushed, Table T being created by the creation section 104 when the preview button 92 is pushed is displayed in the on-screen preview 203. When the send button 93 is pushed, an electronic mail enclosing Table T is sent out. When the cancel button 94 is pushed, the creation section 104 cancels the creation of Table T.

Figure 10A:
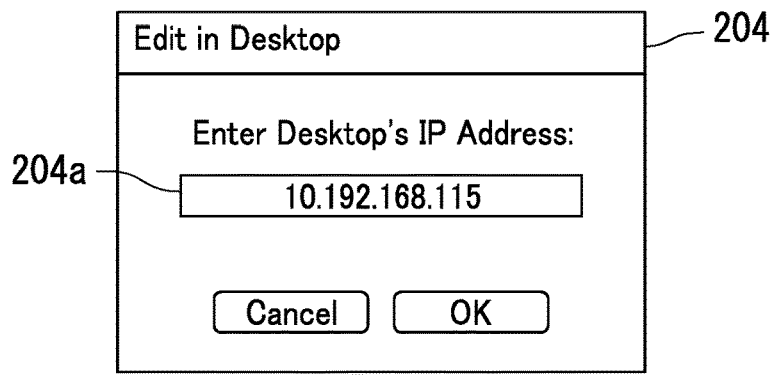
FIG. 10A illustrates a dialog box displayed on the display section in the embodiment.

Modifications to the first entry areas F1 by using the external device 2 will next be described with reference to FIGS. 1, 5, and 10A to 10C. FIG. 10A illustrates a dialog box 202 displayed on the display section 200. When the access button 65 illustrated in FIG. 5 is pushed, the display section 200 displays the dialog box 204 illustrated in FIG. 10A. The dialog box 204 contains an IP address entry area 204a. When the user enters an IP address in the IP address entry area 204a, the communication section 300 connects the modification section 105 to the external device 2 corresponding to the entered IP address to allow the external device 2 to control the modification section 105.

Figure 10B:
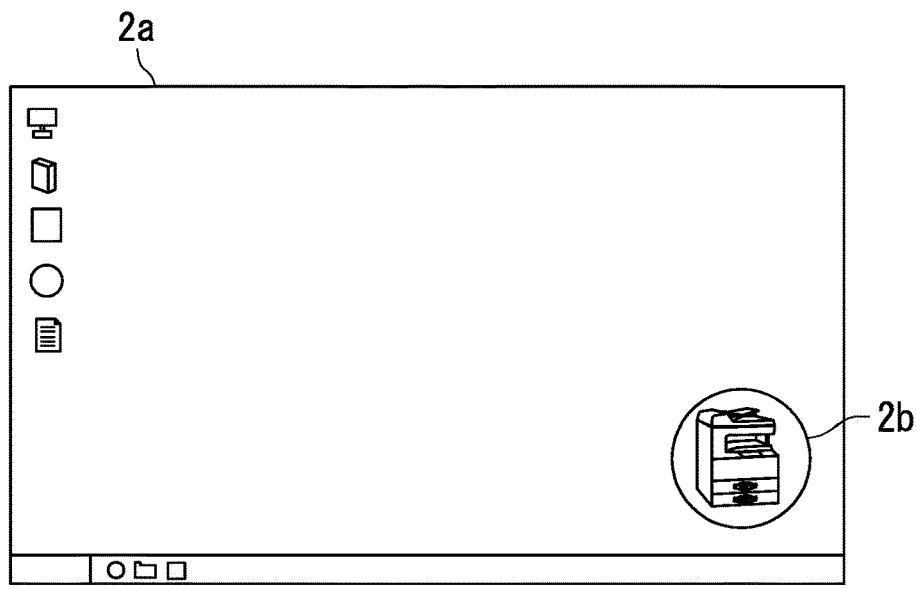
FIG. 10B illustrates a desktop window displayed on a terminal in the embodiment.
Figure 10C:
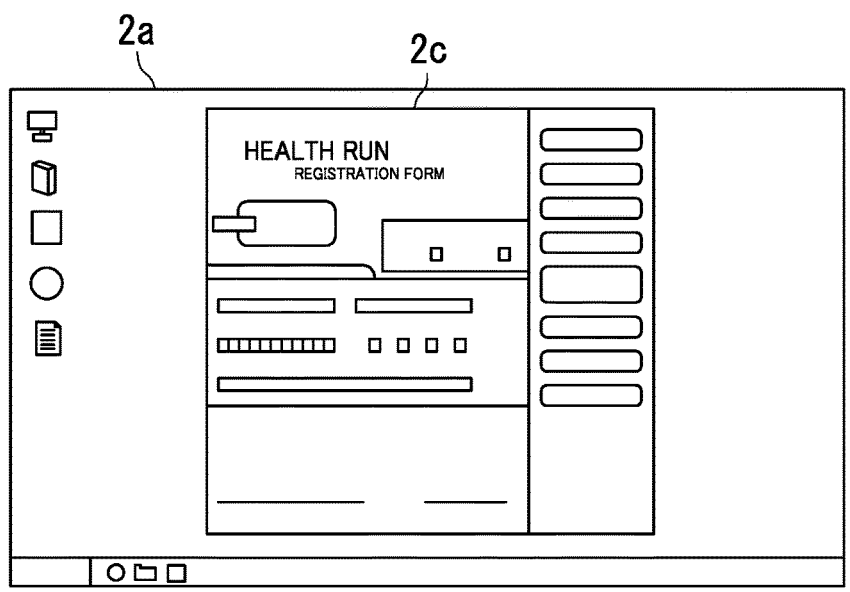
FIG. 10C illustrates a screen for receiving an alteration to an entry area displayed on the terminal in the embodiment.

FIG. 10B illustrates a display section 2a of the external device 2. As illustrated in FIG. 10, when the communication section 300 connects the modification section 105 to the external device 2, the display section 2a displays an icon 2b. Specifically, the modification section 105 transmits an image of the icon 2b to the external device 2 through the communication section 300, thereby causing the display section 2a of the external device 2 to display the icon 2b. When the icon 2b is pushed, the display section 2a displays, as illustrated in FIG. 10C, the on-screen preview 201 containing the first image G1 illustrated in FIG. 5. This enables the user to control the modification section 105 by operating the external device 2.

As described with reference to FIGS. 1, 5, and 2, the present embodiment connects the modification section 105 to the external device 2 to allow the user to control the modification section 105 through the external device 2. It is therefore possible to operate the modification section 105 without directly operating the image forming apparatus 1. This improves user convenience.

Figure 11:
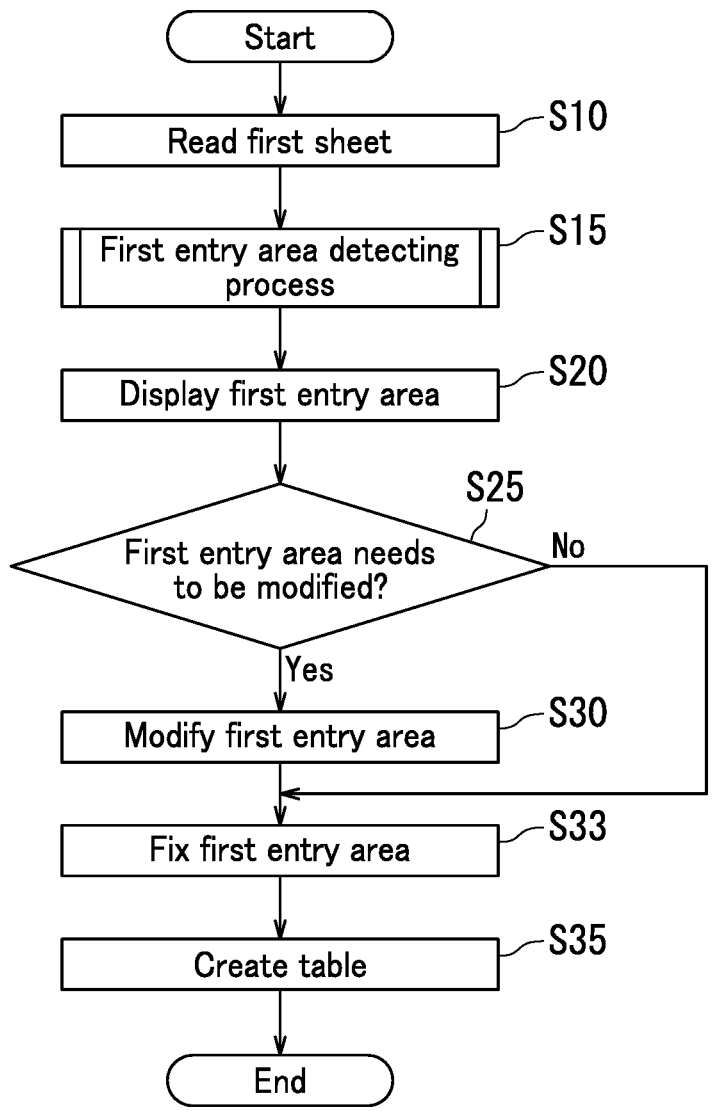
FIG. 11 is a flow chart depicting first image processing executed by the image forming apparatus according to the embodiment.

Processing of the first image G1 executed by the image forming apparatus 1 will next be described with reference to FIG. 11. FIG. 11 is a flow chart depicting the processing of the first image G1 executed by the image forming apparatus 1. As illustrated in FIG. 11, at Step S10, the reading section 400 first reads the first image G1 formed on the first sheet. At Step S15, the first detector 101 then performs a detection process of the first entry areas F1 from the first image G1 read at Step S10. At Step S20, the display section 200 then displays the on-screen preview 201 containing the first entry areas F1. This allows the user to confirm the detected first entry areas F1 in the on-screen preview 201.

At Step S25, the modification section 105 determines whether or not the first entry areas F1 need to be modified. Specifically, while the on-screen preview 201 is being displayed, the modification section 105 determines whether or not at least one of buttons is pushed. Here, the buttons include the first add button 60, the second add button 61, the alteration button 62, and the remove button 63. When at least one of the buttons is pushed, the modification section 105 determines that the first entry areas F1 need be modified. At Step S25, when negative determination (No at Step S25) is made, the processing proceeds to Step S33. At Step S25, when affirmative determination (Yes at Step S25) is made, the processing proceeds to Step S30.

At Step S30, the modification section 105 receives at least one of modifications according to the button pushed at Step S25. Here, the modifications include an alteration of a first entry area F1, addition of a first entry area F1, and removal of a first entry area F1. At Step S33, the creation section 104 then fixes the first entry areas F1. At Step S35, the creation section 104 then creates Table T.

Figure 12:
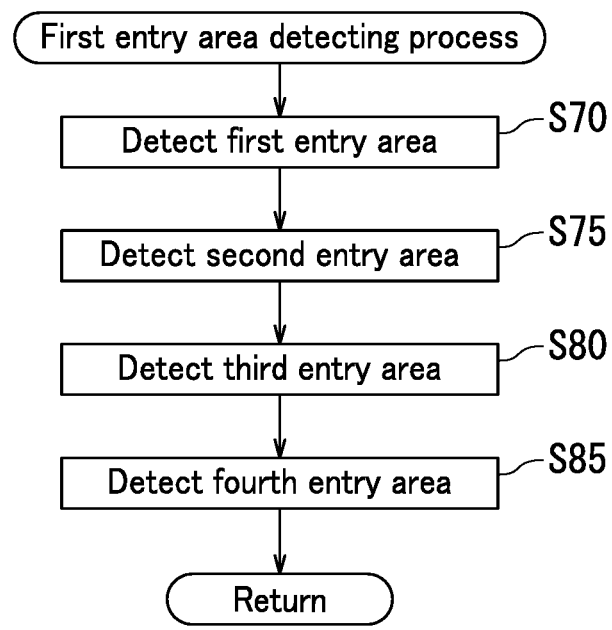
FIG. 12 is a flow chart depicting a first entry area detecting process executed by a first detector in the present embodiment.

A first entry area detecting process by the first detector 101 will next be described with reference to FIG. 12. FIG. 12 is a flow chart depicting the first entry area detecting process corresponding to Step S15 of FIG. 11. At Step S70, the first detector 101 first detects the first character areas A1. At Step S75, the first detector 101 then detects the second character areas A2. At Step S80, the first detector 101 then detects the third character areas A3. At Step S85, the first detector 101 then detects the fourth character areas A4.

Figure 13:
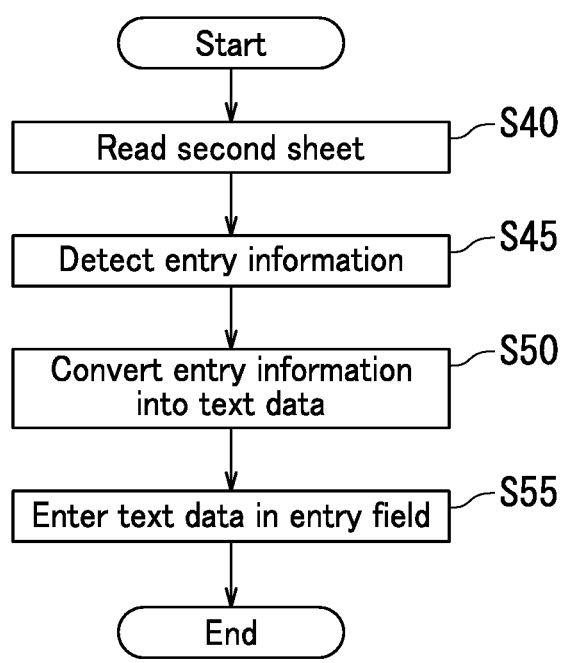
FIG. 13 is a flow chart depicting second image processing executed by the image forming apparatus according to the present embodiment.

Processing of the second image G2 executed by the image forming apparatus 1 will next be described with reference to FIG. 13. FIG. 13 is a flow chart depicting the processing of the second image G2. At Step S40, the reading section 400 reads the second image G2 formed on the second sheet. At Step S45, the second detector 102 specifies the second entry areas F2 based on the first entry areas F1 fixed at Step S33 illustrated in FIG. 11, and then detects respective pieces of entry information entered in the second entry areas F2.

At Step S50, the conversion section 103 then converts the pieces of entry information detected at Step S45 into respective pieces of text data. At Step S55, the creation section 104 then individually enters the pieces of text data in entry fields C15 to C26 corresponding to the first entry areas F1.

As described above with reference to FIGS. 11 to 13, the image forming apparatus 1 according to the present embodiment executes the processing of the first image G1 illustrated in FIG. 11 once, and repeats the processing of the second image G2 illustrated in FIG. 13. Thus, the processing of the first image G1 needs only to be executed once even if the number of the second sheets is enormous. This improves user convenience.

In the present embodiment, the first entry areas F1 contained in the first image G1 are detected, and the second entry areas F2 in the second image G2 are specified based on the respective detection results of the first entry areas F1. Respective pieces of entry information entered in the specified second entry areas F2 are then detected. Accordingly, for example, detection of first entry areas F1 in advance from the template of the registration card for the marathon race as the first image G1 enables detection of respective pieces of entry information from the second entry areas F2 in the filled-in registration card for the marathon race as the second image G2. This enables precise detection of the respective pieces of entry information from the second image G2.

In the present embodiment, after the first image G1 formed on the first sheet is read in advance, the user only causes the reading section 400 to read the second sheet, thereby enabling detection of the respective pieces of entry information entered in the second sheet. It is therefore possible to save user labor of entering, while checking respective pieces of information in the filled-in second sheet one by one, the respective pieces of information in the personal computer. It is also possible to prevent an input error caused by manually entering text data in the personal computer.

The embodiment of the present disclosure has been described above with reference to the drawings (FIGS. 1 to 13). However, the present disclosure is not limited to the above embodiment and may be implemented in various manners within a scope not departing from the gist of the present disclosure (for example (1) to (9) below). The drawings schematically illustrate main elements of configuration to facilitate understanding thereof. Aspects of the elements of configuration illustrated in the drawings, such as thickness, length, and number, may differ in practice for the sake of convenience for drawing preparation. Furthermore, aspects of the elements of configuration illustrated in the above embodiment, such as shape and dimension, are examples and are not particularly limited. The elements of configuration may be variously altered within a scope not substantially departing from the configuration of the present disclosure.

(1) As described with reference to FIG. 1, the image forming apparatus 1 communicates with the external device 2 via the communication network N. The image forming apparatus 1 need not necessarily communicate with the external device 2.

(2) As described with reference to FIG. 3A, the first character area A1 is rectangular in shape. The first character area A1 may however have a quadrilateral shape, and examples thereof may include a parallelogram, a rhombus, and a trapezoid.

(3) As described with reference to FIG. 3B, the second character area A2 is square in shape. The second character area A2 may however be visually square in shape, and the four sides 20a to 20d thereof may be different from each other in length. The four corners thereof may also be curved.

(4) As described with reference to FIG. 3C, the line segment 30a included in the third character area A3 is a straight line. The line segment 30a may however be a wavy line or a dashed line.

(5) As described with reference to FIG. 3C, the height L2 of the adjacent area 30B of the third character area A3 is set to the height of each first character area A1 or the height of each second character area A2, detected from the first image G1. However, when the first image G1 contains not a first character area A1 nor a second character area A2, the height L2 of the adjacent area 30B may be set to a predetermined value. The predetermined value is stored in the storage of the controller 100. When a character(s) is(are) adjacent to the third character area A3, the height L2 of the adjacent area 30B may be set to height of the character(s) adjacent to the third character area A3.

(6) As described with reference to FIG. 3D, the number of the fourth character areas A4 is five. The number of the fourth character areas A4 may however be greater than or equal to 2.

(7) As described with reference to FIG. 1, the reading section 400 individually reads the first image G1 formed on the first sheet and the second image G2 formed on the second sheet. The image forming apparatus 1 may include a means for acquiring each of the first image G1 and the second image G2 in place of the reading section 400. For example, the image forming apparatus 1 may acquire the first image G1 and the second image G2 through a camera. Alternatively, for example, the image forming apparatus 1 may acquire the first image G1 and the second image G2 from external memory. For example, the image forming apparatus 1 may acquire the first image G1 and the second image G2 through the Internet.

(8) As described with reference to FIG. 6, IDs 70 to 81 are sequentially assigned from the upper left to the lower right of the first image G1. IDs 70 to 81 may be sequentially assigned from the upper right to the lower left of the first image G1 as long as every first entry area F1 is assigned an ID.

(9) As described with reference to FIG. 2, the first detector 101 detects the first entry areas F1 from the first image G1 of the first sheet as the template. The detector may however detect the entry areas from the image of a filled-in sheet. A specific example is described with reference to FIG. 7. The image forming apparatus 1 processes the second image G2 including the second entry areas F2. Different pieces of entry information are individually entered in the second entry areas. The first detector 101 detects the first entry areas F1 from the second image G2, and cannot detect any second entry area F2 in which entry information is entered. The on-screen preview 201 accordingly includes the respective detection results of the first entry areas F1 by the first detector 101, and the second entry areas F2. This therefore allows the user to, while the on-screen preview 201 is being displayed, instruct the modification section 105 of the image forming apparatus 1 to modify at least one of the modifications. Here, examples of the modifications include an alteration of a second entry area F2, addition of a second entry area F2, and a removal of a second entry area F2. The modification section 105 receives at least one of the modifications. The second entry area F2, an alteration to which is received by the modification section 105, is associated with a corresponding first entry area F1. It is therefore possible to detect the first entry areas F1 in advance even when the second image G2 contains the pieces of entry information. This enables precise detection of the pieces of entry information from the second image G2 even with no template sheet. Here, the second entry area F2 corresponds to an "entry area". The first detector 101 corresponds to a "detector".

What is claimed is:

1. An information processing device that processes a first image and a second image,
    the first image containing a first entry area that is blank, the first image being a template image, and
    the second image including a second entry area which is the same as the first entry area and in which entry information has been entered,
    wherein the information processing device comprises:
    a first detector configured to detect the first entry area from the first image;
    a second detector configured to specify the second entry area from the second image based on a detection result of the first entry area by the first detector and detect the entry information entered in the specified second entry area, and
    a modification section configured to make at least one of modifications that include addition of the first entry area that is blank, an alteration to a size of the first entry area that is blank, and removal of the first entry area that is blank.

2. The information processing device according to claim 1, wherein
    the first entry area includes a first character area that is blank and allows the entry information containing a character to be entered therein, and
    the first character area has a quadrilateral shape including pairs of adjacent sides which are different in length.

3. The information processing device according to claim 1, wherein
    the first entry area includes a second character area that is blank and that allows the entry information containing a check mark to be entered therein, and
    the second character area has a quadrilateral shape.

4. The information processing device according to claim 1, wherein
    the first entry area includes a third character area that is blank and that allows the entry information containing a character to be entered therein, and the third character area includes a line segment elongated in one direction.

5. The information processing device according to claim 1, wherein
the first entry area includes fourth character areas that are blank and that allows characters as the entry information to be individually entered therein, and
each of the fourth character areas has a quadrilateral shape,
the fourth character areas are aligned in a straight line, and
of the fourth character areas, an interval between each pair of adjacent fourth character areas is shorter than a length of one side of each fourth character area.

6. The information processing device according to claim 1, further comprising
a conversion section configured to convert the entry information detected from the second image into text data, and
a creation section configured to create a table including entry fields based on a detection result of the first entry area by the first detector, wherein
the creation section enters the text data in an entry field, corresponding to the first entry area, of the entry fields.

7. The information processing device according to claim 1, further comprising
a communication section configured to connect the modification section to an external device to allow the modification section to be controlled through the external device.

8. The information processing device according to claim 1, further comprising
a reading section configured to individually read the first image formed on a first sheet and the second image formed on a second sheet.

9. The information processing device according to claim 1, further comprising a display section including a display that displays the first image, and a touch sensor that receives a user operation, wherein
the modification section makes the addition of the first entry area that is blank, according to the user operation, with respect to the display section, which is a drag operation, a pinch-out operation, a pinch-in operation, a slide operation, or a flick operation.

10. The information processing device according to claim 1, further comprising a display section including a display that displays the first image, and a touch sensor that receives a user operation, wherein
the modification section makes the alteration to the size of the first entry area that is blank, according to the user operation, with respect to the display section, which is a drag operation, a pinch-out operation, a pinch-in operation, a slide operation, or a flick operation.

11. The information processing device according to claim 1, further comprising a display section including a display that displays the first image, and a touch sensor that receives a user operation, wherein
the modification section makes the removal of the first entry area that is blank, according to the user operation, with respect to the display section, which is a drag operation, a pinch-out operation, a pinch-in operation, a slide operation, or a flick operation.

12. The information processing device according to claim 1, further comprising a display section including a display that displays the first image, and a touch sensor that receives a user operation, wherein
the display section displays an add button, an alteration button, and a remove button, and
the modification section makes at least one of the modifications that include the addition of the first entry area that is blank, the alteration to the size of the first entry area that is blank, and the removal of the first entry area that is blank, according to the user operation with respect to the display section after any one of the add button, the alteration button, and the remove button is pressed.

* * * * *